US009626511B2

(12) United States Patent  
McCorkendale et al.

(10) Patent No.: US 9,626,511 B2  
(45) Date of Patent: Apr. 18, 2017

(54) AGENTLESS ENFORCEMENT OF APPLICATION MANAGEMENT THROUGH VIRTUALIZED BLOCK I/O REDIRECTION

(75) Inventors: Bruce McCorkendale, Manhattan Beach, CA (US); Matthew Steele, Oakland, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 1166 days.

(21) Appl. No.: 12/198,845

(22) Filed: Aug. 26, 2008

(65) Prior Publication Data

US 2010/0058431 A1 Mar. 4, 2010

(51) Int. Cl.
*G06F 11/00* (2006.01)
*G06F 21/57* (2013.01)
*G06F 21/55* (2013.01)

(52) U.S. Cl.
CPC ............ *G06F 21/57* (2013.01); *G06F 21/554* (2013.01)

(58) Field of Classification Search
CPC ...................................................... G06F 21/57
USPC ...................................................... 726/21–30
See application file for complete search history.

(56) References Cited

U.S. PATENT DOCUMENTS

| | | | |
|---|---|---|---|
| 6,336,175 B1 * | 1/2002 | Shaath et al. ................. | 711/163 |
| 6,886,035 B2 * | 4/2005 | Wolff ............................ | 709/219 |
| 6,941,470 B1 * | 9/2005 | Jooste ............................... | 726/4 |
| 7,093,239 B1 * | 8/2006 | van der Made .............. | 717/135 |
| 7,480,655 B2 * | 1/2009 | Thomas et al. | |
| 7,565,685 B2 * | 7/2009 | Ross et al. ......................... | 726/1 |
| 7,571,482 B2 * | 8/2009 | Polyakov et al. .............. | 726/24 |
| 7,574,622 B2 * | 8/2009 | Soran et al. .................. | 714/6.22 |
| 7,647,636 B2 * | 1/2010 | Polyakov et al. .............. | 726/24 |
| 7,680,996 B2 * | 3/2010 | Komarov et al. ............ | 711/162 |
| 7,693,838 B2 * | 4/2010 | Morgan et al. ............... | 707/781 |
| 7,797,748 B2 * | 9/2010 | Zheng et al. .................. | 726/24 |
| 7,845,009 B2 * | 11/2010 | Grobman ........................ | 726/24 |
| 8,042,190 B2 * | 10/2011 | Sahita et al. ................... | 726/27 |
| 8,286,238 B2 * | 10/2012 | Durham et al. ............... | 726/22 |
| 8,701,187 B2 * | 4/2014 | Schluessler et al. .......... | 726/23 |

(Continued)

FOREIGN PATENT DOCUMENTS

EP 1 914 956 A1 4/2008
WO WO 01/77811 A1 10/2001

(Continued)

OTHER PUBLICATIONS

Extended European Search Report for Application No. 09010823.4-2212 dated Nov. 23, 2009.

(Continued)

*Primary Examiner* — Steven Kim
(74) *Attorney, Agent, or Firm* — Patent Law Works LLP

(57) ABSTRACT

Application authorization management is provided without installation of an agent at an operating system level. A component runs outside of the operating system, in an AMT environment. AMT is utilized to examine the operating system for applications. Identified applications are checked against a whitelist or a blacklist. Responsive to determining that an identified application is not authorized, AMT is used to redirect input/output requests targeting the application to an alternative image, which can, for example, warn the user that the application is not authorized.

10 Claims, 2 Drawing Sheets

(56) References Cited

U.S. PATENT DOCUMENTS

| | | | |
|---|---|---|---|
| 2002/0194487 A1* | 12/2002 | Grupe | 713/200 |
| 2004/0064736 A1* | 4/2004 | Obrecht et al. | 713/201 |
| 2005/0091655 A1* | 4/2005 | Probert et al. | 718/100 |
| 2007/0136807 A1* | 6/2007 | DeLiberato et al. | 726/22 |
| 2008/0005527 A1* | 1/2008 | Bang | G06F 9/441 711/202 |
| 2008/0022124 A1* | 1/2008 | Zimmer et al. | 713/189 |
| 2008/0127348 A1* | 5/2008 | Largman et al. | 726/24 |
| 2008/0148390 A1* | 6/2008 | Zimmer et al. | 726/17 |
| 2008/0163204 A1* | 7/2008 | Morgan et al. | 718/1 |
| 2008/0244114 A1* | 10/2008 | Schluessler et al. | 710/24 |
| 2008/0256599 A1* | 10/2008 | Lee et al. | 726/2 |
| 2009/0038017 A1* | 2/2009 | Durham et al. | 726/27 |
| 2009/0106263 A1* | 4/2009 | Khalid | G06F 17/30115 |
| 2009/0165117 A1* | 6/2009 | Brutch | G06F 21/629 726/14 |
| 2009/0222889 A1* | 9/2009 | Challener et al. | 726/3 |
| 2009/0288167 A1* | 11/2009 | Freericks et al. | 726/23 |
| 2009/0319782 A1* | 12/2009 | Lee | 713/156 |

FOREIGN PATENT DOCUMENTS

| | | |
|---|---|---|
| WO | WO 2007/058889 A2 | 5/2007 |
| WO | WO 2007/058889 A3 | 5/2007 |

OTHER PUBLICATIONS

"Intel Active Management Technology System Defense and Agent Presence Overview," Version 3.0.4, Feb. 2007.
Intel vPro—Wikipedia, the free encyclopedia; http:en.wikipedia.org/wiki/Intel_vPro; Jul. 15, 2008.
Intel Active Management Technology—Wikipedia, the free encyclopedia; http:en.wikipedia.org/wiki/Intel_Active_Management_Technology; Jun. 23, 2008.
English language translation of relevant portions of Japanese Office Action for Japanese counterpart Application No. 2009-192882 dated Jan. 9, 2014, 1 page, translation made by Japanese patent attorney prosecuting Japanese counterpart application.
English language European Office Action for European counterpart Application No. 09 010 823.4-1870 dated Jul. 31, 2015, 4 pages.

* cited by examiner

AGENTLESS ENFORCEMENT OF APPLICATION MANAGEMENT THROUGH VIRTUALIZED BLOCK I/O REDIRECTION

TECHNICAL FIELD

This invention pertains generally to computer security, and more specifically to enforcing application management on a computer without requiring direct interaction with the operating system.

BACKGROUND

Computer security software, such as policy enforcement and configuration management solutions, typically requires deployment of an agent within the operating system of the computer being protected. However, the act of agent deployment itself assumes the existence of a level of control and management over the computers to be protected which often does not exist. It is the very computers for which such control is not available that are most in need of protection.

Active management technology (AMT), such as Intel's vPro AMT, is a hardware based technology that provides a runtime environment separate and independent from that of the main general purpose operating system. AMT typically uses a secondary processor on the motherboard of a computer to enable "out of band" interaction with the main operating system. In addition to running independently of the general purpose operating system, the AMT environment can be communicated with independently. It would be desirable to leverage the AMT environment to address the computer security shortcomings discussed above.

SUMMARY

Application authorization management is provided without installation of an agent at an operating system level. A component runs outside of the operating system, in an AMT environment. AMT is utilized to examine the operating system for applications. Identified applications are checked against a whitelist or a blacklist. Responsive to determining that an identified application is not authorized, AMT is used to redirect input/output requests targeting the application to an alternative image, which can, for example, warn the user that the application is not authorized.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
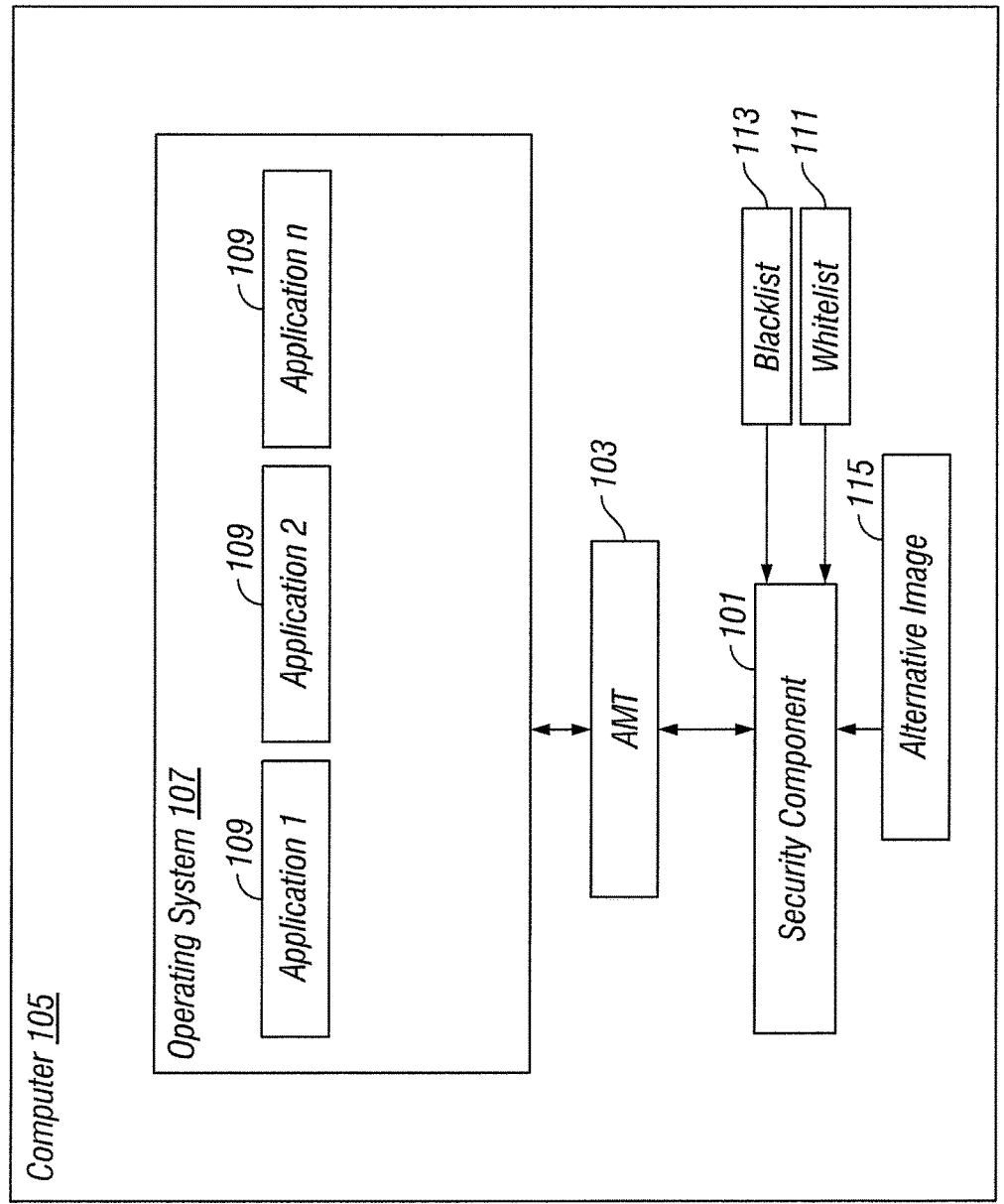
FIG. 1 is a block diagram illustrating providing application blacklisting and whitelisting without installation of an agent at an operating system level, according to some embodiments of the present invention.

FIG. 1 illustrates a system for providing application blacklisting/whitelisting without installation of an agent at an operating system level, according to some embodiments of the present invention. It is to be understood that although various components are illustrated and described above as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a security component 101 runs "out of band" in an AMT environment 103 on a computer 105, without directly interacting with the operating system 107. The security component 101 communicates with the AMT 103 in order to perform an examination of the operating system 107 image for applications 109, all without running an agent on the operating system 107. The security component then runs a security check on found applications 109 to determine whether they are authorized to be run on the computer 105. This security check can comprise determining whether each found application 109 is on a whitelist 111 of applications 109 permitted to be run on the computer 105, and/or determining whether the applications 109 are present on a blacklist 113 of disallowed entities. This/these list(s) 111/113 can be local, or the checks can be in the form of a query made to a remote entity (e.g., a server, not illustrated) on which the list(s) 111/113 is/are maintained. In other embodiments, the security check can comprise an action other than a whitelist 111/blacklist 113 check. For example, the security check can be in the form of a heuristic analysis to identify suspicious applications and/or checking the application for known malicious code signatures.

Responsive to determining that an application 109 is not legitimate, the security component 101 uses the virtualization of block input/output (IO) feature of AMT 103 to manage the application 109. More specifically, when the security component 101 identifies a suspect application 109, it uses the AMT block virtualization to remap the blocks containing the application file 109 (or in some embodiments its file table (e.g., MFT) entry), such that the security component 101 provides an alternative "image" 115 of the file 109 to the operating system 107, through the AMT 103. In other words, I/O requests for the file table entry record or its related sectors are redirected to alternative sectors, on which the alternative image 115 is stored. In some embodiments, the alternative image 115 is stored on the same physical disk as the original file 109 (which remains unmoved and unmodified). In other embodiments, the alternative image 115 is stored remotely (not illustrated). The redirected alternative image 115 can comprise, for example, no operation (NOP) code, or code that provides a notification to the user that the application 109 is not approved for execution on the computer 105. It is to be understood that in different operating environments, file table entries are in different internal formats based on the file system instantiation (e.g., FAT and NTFS (MFT) under Windows, for Linux iNodes, etc.). All such file system formats are within the scope of different embodiments of the present invention.

It is to be understood that an alternative image 115 is typically specific to a given set of operating systems (e.g., Windows, Linux, etc.). For example, Linux code to notify the user that the application 109 is not approved would not likely run under Windows, etc. To address this, a group of alternative images 115 can be maintained, one (or more) for each supported platform. Because only so many operating system sets would likely be supported, the number of alternative images 115 used in the various embodiments would be very manageable.

Note that the main operating system 107 does not contain any type of agent, nor is it aware that the underlying translation occurs. Note further that no changes are actually made to the file system. Instead, the security agent 101 simply redirects I/O requests for the application 109 to the alternative image 115.

Figure 2:
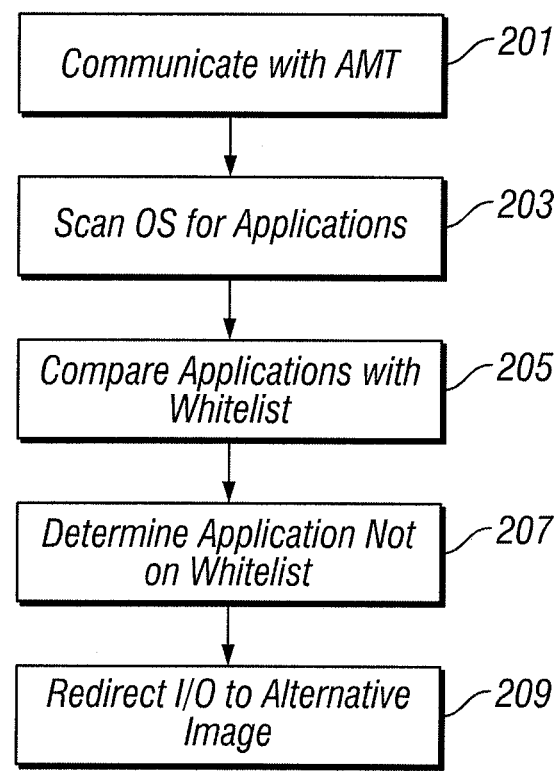
FIG. 2 is a flowchart illustrating steps for application whitelisting without installation of an agent at an operating system level, according to some embodiments of the present invention.

FIG. 2 illustrates steps for application 109 whitelisting without installation of an agent at an operating system level, according to some embodiments of the present invention. As illustrated in FIG. 2, the security component 101 communicates 201 with the AMT 103, in order to scan 203 the operating system for applications 109. The security component 101 compares 205 found applications 109 to a whitelist 111 of permitted applications 109. Responsive to determining 207 that a given application 109 is not on the whitelist 111, the security component 101 utilizes the AMT virtualization of block IO feature to redirect 209 I/O requests for the application 109 to an alternative image 115, which warns the user that the application 109 is not permitted to run on the computer 105.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any computing device. Accordingly, the disclosure of the present invention is intended to be illustrative, but not limiting, of the scope of the invention, which is set forth in the following claims.

What is claimed is:

1. A computer implemented method for providing application management without installation of an agent at an operating system level, the method comprising the steps of:
running a component outside of an operating system in an active management technology (AMT) environment without installation of an agent at an operating system level, by a computer;
identifying, by the component running in the AMT environment, an application by examining the operating system;
maintaining, by the component running in the AMT environment, a the plurality of alternative images that are distinct from the identified application, each alternative image having a file table entry record in a format for a specific operating system;
determining, by the component running in the AMT environment, whether the identified application is not authorized;
in response to having determined that the identified application is not authorized, remapping blocks containing a file of the application, by the component running in the AMT environment, to at least one of the plurality of alternative images, using AMT block virtualization; and
redirecting, by the component running in the AMT environment, input/output requests to a table entry record of the identified application running on the operating system to at least one of the plurality of alternative images that is distinct from the identified application using the remapping, the operating system being unaware of the redirection.

2. The method of claim 1 wherein the step of determining whether the identified application is not authorized further comprises performing at least one step from a group of steps consisting of:
determining whether the identified application is on a local whitelist of authorized applications; determining whether the identified application is on a remote whitelist of authorized applications; determining whether the identified application is on a local blacklist of unauthorized applications; determining whether the application is on a remote
blacklist of unauthorized applications, by a computer;
performing a heuristic analysis of the identified application; and
checking the identified application for at least one malicious code signature.

3. The method of claim 1 wherein the plurality of alternative images are stored on at least one of
a local physical medium on which the identified application is stored and
a remote physical medium.

4. The method of claim 1 wherein at least one of the alternative images comprises at least one of
no operation (NOP) code and
code to provide a notification to a user concerning the unauthorized application.

5. At least one non-transitory computer readable medium containing program code, that, when executed by at least one processor causes a computer to perform a method for providing application management without installation of an agent at an operating system level, the method comprising the steps of:
- running a component outside of an operating system in an active management technology (AMT) environment without installation of an agent at an operating system level;
- identifying, by the component running in the AMT environment, an application by examining the operating system;
- maintaining, by the component running in the AMT environment, a plurality of alternative images that are distinct from the identified application, each alternative image having a file table entry record in a format for a specific operating image having a file table entry record in a format for a specific operating system;
- determining, by the component running in the AMT environment, whether the identified application is not authorized;
- in response to having determined that the identified application is not authorized, remapping blocks containing a file of the application, by the component running in the AMT environment, to at least one of the plurality of alternative images, using AMT block virtualization; and
- redirecting, by the component running in the AMT environment input/output requests to a table entry record of the identified application running on the operating system to at least one of the plurality of alternative images that is distinct from the identified application using the remapping, the operating system being unaware of the redirection.

6. The at least one non-transitory computer readable medium of claim 5 wherein the step of performing a security check on an identified application further comprises performing at least one step from a group of steps consisting of:
- determining whether the identified application is on a local whitelist of authorized applications;
- determining whether the identified application is on a remote whitelist of authorized applications;
- determining whether the identified application is on a local blacklist of unauthorized applications;
- determining whether the identified application is on a remote blacklist of unauthorized applications;
- performing a heuristic analysis of the identified application; and
- checking the identified application for at least one malicious code signature.

7. The at least one non-transitory computer readable medium of claim 5, wherein the step of redirecting the input/output requests to the table entry record of the identified application, further comprises:
- redirecting the input/output requests targeting the identified application to sectors on which the image that is distinct from the identified application is stored.

8. The at least one non-transitory computer readable medium of claim 5 wherein the plurality of alternative images are stored on at least one of
- a local physical medium on which the identified application is stored and
- a remote physical medium.

9. The at least one non-transitory computer readable medium of claim 5 wherein at least one of the alternative images comprises at least one of
- no operation (NOP) code and
- code to provide a notification to a user concerning the unauthorized application.

10. A computer for providing application management without installation of an agent at an operating system level, the computer system comprising:
- at least one processor; and
- a memory storing computer instructions when executed by the at least one processor causes the computer to perform the method, the method comprising:
- running a component outside of an operating system in an active management technology (AMT) environment without installation of an agent at an operating system level, by a computer;
- identifying, by the component running in the AMT environment, an application by examining the operating system;
- maintaining, by the component running in the AMT environment, a the plurality of alternative images that are distinct from the identified application, each alternative image having a file table entry record in a format for a specific operating system;
- determining, by the component running in the AMT environment, whether the identified application is not authorized;
- in response to having determined that the identified application is not authorized, remapping blocks containing a file of the application, by the component running in the AMT environment, to at least one of the plurality of alternative images, using AMT block virtualization; and
- redirecting, by the component running in the AMT environment, input/output requests to a table entry record of the identified application running on the operating system to at least one of the plurality of alternative images that is distinct from the identified application using the remapping, the operating system being unaware of the redirection.

* * * * *